(12) United States Patent
Wang et al.

(10) Patent No.: US 11,828,965 B2
(45) Date of Patent: Nov. 28, 2023

(54) DIMMING SUBSTRATE, MANUFACTURING METHOD THEREOF, DIMMING STRUCTURE AND DIMMING MODULE

(71) Applicants: Beijing BOE Sensor Technology Co., Ltd., Beijing (CN); BOE Technology Group Co., Ltd., Beijing (CN)

(72) Inventors: Changyin Wang, Beijing (CN); Juan Chen, Beijing (CN); Peng Liang, Beijing (CN); Chunlei Wang, Beijing (CN); Jing Yu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 70 days.

(21) Appl. No.: 17/483,623

(22) Filed: Sep. 23, 2021

(65) Prior Publication Data

US 2022/0229217 A1  Jul. 21, 2022

(30) Foreign Application Priority Data

Jan. 18, 2021 (CN) .......................... 202110065354.4

(51) Int. Cl.
*G02B 5/30* (2006.01)
*G02B 27/28* (2006.01)
*B60J 3/04* (2006.01)
*G02F 1/1337* (2006.01)
*B60J 1/00* (2006.01)
*G02F 1/1333* (2006.01)

(52) U.S. Cl.
CPC .............. *G02B 5/3016* (2013.01); *B60J 3/04* (2013.01); *G02B 27/281* (2013.01); *B60J 1/00* (2013.01); *C09K 2323/05* (2020.08); *C09K 2323/06* (2020.08); *G02B 27/286* (2013.01); *G02F 1/1337* (2013.01); *G02F 1/133305* (2013.01)

(58) Field of Classification Search
CPC .... C09K 2323/05; C09K 2323/06; B60J 3/04; B60J 1/00; G02B 5/3016; G02B 5/281; G02B 5/286; G02F 1/1337; G02F 1/133305
USPC ..................................................... 428/1.5, 1.6
See application file for complete search history.

(56) References Cited

U.S. PATENT DOCUMENTS

| | | | | |
|---|---|---|---|---|
| 2006/0008225 A1* | 1/2006 | Naitou | ...................... | G02B 6/12 385/129 |
| 2020/0193876 A1* | 6/2020 | Zhang | ...................... | G09F 9/301 |
| 2022/0373835 A1* | 11/2022 | Chen | ................. | G02F 1/134309 |

FOREIGN PATENT DOCUMENTS

CN           111624800 A  *  9/2020  ................ B60J 1/20

* cited by examiner

*Primary Examiner* — Ruiyun Zhang
(74) *Attorney, Agent, or Firm* — IPro, PLLC (57) ABSTRACT

The present disclosure provides a dimming substrate, a manufacturing method of the dimming substrate, a dimming structure and a dimming module, and relates to the technical field of display. According to the present disclosure, a bonding layer, a flexible base plate, an electrode layer and an orientation layer are sequentially arranged on a rigid carrier plate, and the bonding layer includes one or more adhesive layers. By removing flexible base films from the bonding layer, the bonding layer only includes one or more adhesive layers, such that the dimming substrate includes less flexible base films.

9 Claims, 4 Drawing Sheets

DIMMING SUBSTRATE, MANUFACTURING METHOD THEREOF, DIMMING STRUCTURE AND DIMMING MODULE

CROSS REFERENCE TO RELEVANT DISCLOSURES

The present application claims the priority of the Chinese patent application filed on Jan. 18, 2021 before the Chinese Patent Office with the application number of 202110065354.4 and the title of "DIMMING SUBSTRATE, MANUFACTURING METHOD THEREOF, DIMMING STRUCTURE AND DIMMING MODULE", which is incorporated herein in its entirety by reference.

TECHNICAL FIELD

The present disclosure relates to the technical field of display, in particular to a dimming substrate, a manufacturing method of the dimming substrate, a dimming structure and a dimming module.

BACKGROUND

With the development of science and technology, high-tech display technologies have been applied to various fields. For example, dimming structures are applied to vehicle windows to change the light transmittance of windows, thus realizing the switch between a dark state and a bright state of the windows.

At present, glass is generally used as a base material in a dimming substrate of a dimming structure. However, in some fields, such as the field of automobile windows, usually the dimming substrate needs to meet the design requirements of large-curvature hyperbolic windows.

SUMMARY

The present disclosure provides a dimming substrate, a manufacturing method of the dimming substrate, a dimming structure and a dimming module to solve the problem that subsequent processes cannot be continued because a rigid carrier plate is likely to warp in an existing product manufacturing process.

In a first aspect, the present disclosure discloses a dimming substrate, which includes a rigid carrier plate, a bonding layer, a flexible base plate, an electrode layer and an orientation layer which are sequentially arranged in layer configuration;

Wherein, the bonding layer comprises one or more adhesive layers.

Optionally, the bonding layer comprises a plurality of adhesive layers, and foaming materials are doped in the adhesive layers, close to the flexible base plate, in the bonding layer.

Optionally, a thermal shrinkage rate of the flexible base plate in a first direction is less than or equal to 0.01%, and a thermal shrinkage rate of the flexible base plate in a second direction is also less than or equal to 0.01%, wherein the first direction and the second direction are perpendicular to each other, and are both parallel to a plane where the flexible base plate is located.

Optionally, the flexible base plate has a smaller size than the rigid carrier plate in a first direction, and also has a smaller size than the rigid carrier plate in a second direction;

wherein the first direction and the second direction are perpendicular to each other, and are both parallel to a plane where the flexible base plate is located.

Optionally, the rigid carrier plate has a thickness of 0.5 mm to 1.1 mm.

Optionally, the rigid carrier plate has a Young's modulus greater than 80 Pa.

Optionally, the rigid carrier plate comprises a metal carrier plate and a glass carrier plate arranged on a same layer; the metal carrier plate is provided with a perforative opening; the glass carrier plate is arranged in the opening;

wherein the metal carrier plate has a larger rigidity than the glass carrier plate.

The dimming substrate further comprising a stress buffer layer arranged between the rigid carrier plate and the bonding layer, wherein, the stress buffer layer is configured to recover to a flat state corresponding to a low temperature during a high-temperature cooling process of the dimming substrate, so as to generate an applied force opposite to a deformation direction of the flexible base plate.

Optionally, the stress buffer layer is made from two-way memory alloy.

Optionally, the stress buffer layer is of a netlike structure.

Optionally, the netlike structure includes a plurality of grids, each grid includes a plurality of wires and a hollow area, the wires are connected end to end in sequence; and the hollow area is hexagon.

Optionally, the electrode layer is a surface electrode or includes a plurality of strip electrodes.

In a second aspect, the present disclosure further discloses a dimming structure, which includes a first dimming substrate, a second dimming substrate and a liquid crystal layer, wherein the first dimming substrate and the second dimming substrate are arranged oppositely; the liquid crystal layer is arranged between the first dimming substrate and the second dimming substrate;

Wherein, each of the first dimming substrate and the second dimming substrate is a structure obtained by stripping the rigid carrier plate and the bonding layer from the above-mentioned dimming substrate; and the orientation layers, the electrode layers and the flexible base plates in the first dimming substrate and the second dimming substrate are all arranged away from the liquid crystal layer in sequence.

Optionally, the liquid crystal layer is a dye liquid crystal layer.

In a third aspect, the present disclosure further discloses a dimming module, which includes the above-mentioned dimming structure.

In a fourth aspect, the present disclosure further discloses a manufacturing method of a dimming substrate, which includes:

providing a rigid carrier plate and a flexible base plate;

bonding the rigid carrier plate with the flexible base plate through a bonding layer;

forming an electrode layer at a side, away from the bonding layer, of the flexible base plate; and forming an orientation layer at a side, away from the flexible base plate, of the electrode layer;

wherein, the bonding layer comprises one or more adhesive layers.

Optionally, the step of bonding the rigid carrier plate with the flexible base plate through the bonding layer includes:

forming a stress buffer layer on the rigid carrier plate; and bonding the rigid carrier plate provided with the stress buffer layer with the flexible base plate through the bonding layer, wherein the bonding layer is located at a side, away from the rigid carrier plate, of the stress buffer layer.

BRIEF DESCRIPTION OF THE DRAWINGS

To describe the technical solutions in the embodiments of the present disclosure or in the prior art more clearly, the following briefly introduces the accompanying drawings to be used in the descriptions of the embodiments or the prior art. Obviously, the accompanying drawings in the following description show merely some embodiments of the present disclosure, and a person of ordinary skills in the art may still derive other drawings from these accompanying drawings without creative efforts.

DETAILED DESCRIPTION

In order to make the above purposes, features and advantages of the present disclosure clearer and more comprehensible, the present disclosure will be further described in detail below with reference to the accompanying drawings and specific embodiments.

In the related art, a bonding layer used to bond a rigid carrier plate with a flexible base plate in a dimming substrate includes flexible base films and adhesive layers which are respectively arranged at two sides of the flexible base films, namely the flexible base films are sandwiched between the two adhesive layers to form the bonding layer.

In the product manufacturing process, when a product is cooled after passing through a high-temperature environment, thermal shrinkage may happen to the flexible base films; and in addition, when the dimming substrate includes more flexible base films, the flexible base films in the dimming substrate have a larger thermal shrinkage stress. In the related art, a flexible base film in the dimming substrate includes a flexible base plate and a flexible base film body, wherein the flexible base plate is bonded with a rigid carrier plate, and the flexible base film body is arranged in a bonding layer. Therefore, in the related art, the dimming substrate includes two flexible base films which may happen thermal shrinkage at the same time and generate a relatively high thermal shrinkage stress; however, the rigid carrier plate and the flexible base films have a great difference in thermal shrinkage rate, so the thermal shrinkage stress generated by the flexible base films may cause serious warpage of the rigid carrier plate.

Therefore, according to the embodiment of the present disclosure, by removing the flexible base films from the bonding layer, the bonding layer only includes one or more adhesive layers, such that the dimming substrate includes less flexible base films. Therefore, in a high-temperature cooling process during product manufacturing, the thermal shrinkage stress of the flexible base films may be lowered correspondingly, thus the warpage degree of the rigid carrier plate caused by thermal shrinkage of the flexible base films is lowered, and warpage of the rigid carrier plate is reduced.

Figure 1:
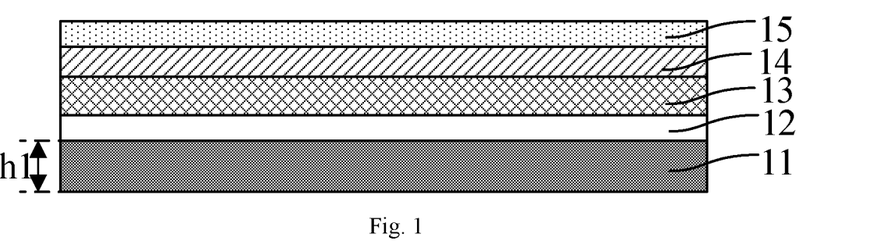
FIG. 1 illustrates a structural schematic diagram of a dimming substrate in an embodiment of the present disclosure.

FIG. 1 illustrates a structural schematic diagram of a dimming substrate in an embodiment of the present disclosure.

The embodiment of the present disclosure provides a dimming substrate, which includes a rigid carrier plate 11, a bonding layer 12, a flexible base plate 13, an electrode layer 14 and an orientation layer 15 arranged in layer configuration in sequence, wherein the bonding layer 12 includes one or more adhesive layers.

Specifically, the rigid carrier plate 11 may be made from an inorganic material such as glass, with a thermal shrinkage rate of 0.001%; the rigid carrier plate 11 and the flexible base plate 13 are bonded with each other through the bonding plate 12; and the flexible base plate 13 is made from organic polymer materials such as polyethylene glycol terephthalate (PET), polyethylene naphthalate (PEN), polyimide (PI), cycloolefin polymer (COP) and transparent polyimide (CPI).

First, the flexible base plate 13 is adhered to the rigid carrier plate 11 through the bonding layer 12, such that the electrode layer 14 and the orientation layer 15 may be conveniently and sequentially formed at a side, away from the bonding layer 12, of the flexible base plate 13.

The electrode layer 14 is made from a transparent conductive material, such as indium tin oxides (ITO), and is used to provide an electric field for liquid crystal molecules in a liquid crystal layer which is subsequently formed between a first dimming substrate and a second dimming substrate, so as to control the deflection of the liquid crystal molecules. The electrode layer 14 may be a whole surface electrode; an orthographic projection of the electrode layer 14 on the flexible base plate 13 may be within or overlapped with an area where the flexible base plate 13 is located; and the electrode layer 14 may include a plurality of strip electrodes parallel to one another.

The orientation layer 15 is made from a PI material, and is used to orientate the liquid crystal molecules in the liquid crystal layer which is subsequently formed between the first dimming substrate and the second dimming substrate.

The bonding layer 12 for bonding the rigid carrier plate 11 with the flexible base plate 13 includes one or more adhesive layers, and does not include the flexible base films in the related art. The rigid carrier plate 11 may be coated with a material of the bonding layer 12 and is then bonded with the flexible base plate 13, and one or more adhesive layers may be formed between the rigid carrier plate 11 and the flexible base plate 13 after the material of the bonding layer is cured; or, the flexible base plate 13 is coated with the material of the bonding layer and is then bonded with the rigid carrier plate 11, and one or more adhesive layers may be formed between the rigid carrier plate 11 and the flexible base plate 13 after the material of the bonding layer is cured; or the bonding layer 12 including one or more adhesive layers is directly bonded with the rigid carrier plate 11 and the flexible base plate 13, respectively.

Therefore, by removing the flexible base films from the bonding layer 12, the bonding layer 12 only includes one or more adhesive layers, thus the dimming substrate includes less flexible base films, namely at the moment the dimming substrate only includes one flexible base film which is the flexible base plate 13. In a product manufacturing process, the orientation layer 15 and a subsequently-formed frame sealing adhesive are both cured in a high-temperature environment; and in a cooling process after the high-temperature process, only the flexible base plate 13 has thermal shrinkage and generates a relatively small thermal shrinkage stress, such that the warpage degree of the rigid carrier plate 11 caused by the thermal shrinkage of the flexible base plate 13 is lowered, and warpage of the rigid carrier plate 11 is reduced.

In addition, an orthographic projection of the flexible base plate 13 on the rigid carrier plate 11 is overlapped with that of the bonding layer 12 on the rigid carrier plate 11, or the orthographic projection of the flexible base plate 13 on the rigid carrier plate 11 is within an area of the orthographic projection of the bonding layer 12 on the rigid carrier plate 11.

Specifically, the bonding layer 12 includes a plurality of adhesive layers; foaming materials are doped in the adhesive layers, close to the flexible base plate 13, in the bonding layer 12, in other words, the foaming materials are doped in the adhesive layers, in contact with the flexible base plate 13, in the bonding layer 12.

After the two dimming substrates are arranged in align with each other later, the rigid carrier plates 11 and the bonding layers 12 in the two dimming substrates need to be separated from the corresponding flexible base plate 13 respectively, that is, the rigid carrier plates 11 and the bonding layers 12 are stripped from the corresponding dimming substrates by adopting a thermal foaming stripping process; therefore, for convenient stripping, foaming materials may be doped in the adhesive layers, close to the flexible base plates 13, in the bonding layers 12; by heating at a high temperature, the bonding layers 12 in which the foaming materials are doped lose an adhesion force, and therefore the flexible base plates 13 are capable of being separated from the bonding layers 12 and the rigid carrier plates 11.

Certainly, the foaming materials may be or may not be doped in the adhesive layers, away from the flexible base plates 13, in the bonding layers 12.

For example, each bonding layer 12 includes two adhesive layers, wherein a foaming material is doped in the adhesive layer in contact with the flexible base plate 13, and no foaming material is doped in the adhesive layer in contact with the rigid carrier plate 11.

In addition, when the bonding layer 12 includes one adhesive layer, a foaming material may be doped in the adhesive layer or no foaming material is doped in the adhesive layer.

In this embodiment of the present disclosure, the flexible base plate 13 has a thermal shrinkage rate less than or equal to 0.01% in a first direction and also has a thermal shrinkage rate less than or equal to 0.01% in a second direction, wherein the first direction and the second direction are perpendicular to each other and are both parallel to a plane where the flexible base plate 13 is located.

Specifically, an orthogonal projection of the flexible base plate 13 on the rigid carrier plate 11 is a rectangle which includes a first side, a second side, a third side and a fourth side, wherein the first side and the second side are parallel to each other; the third side and the fourth side are perpendicular to the first side and the second side; an extension direction of the first side and the second side is determined as the first direction, namely an X direction; and an extension direction of the third side and the fourth side is determined as the second direction, namely a Y direction.

Furthermore, the flexible base plate 13 has a thermal shrinkage rate less than or equal to 0.01% in a first direction and also has a thermal shrinkage rate less than or equal to 0.01% in a second direction; while the rigid carrier plate 11 has a thermal shrinkage rate of 0.001% in both the first direction and the second direction; and warpage of the rigid carrier plate 11 may be further reduced by reducing the difference between the thermal shrinkage rates of the flexible base plate 13 and the rigid carrier plate 11.

For example, the thermal shrinkage rates of the flexible base plate 13 in the first direction and the second direction are 0.005%, 0.002%, etc.

Figure 2:
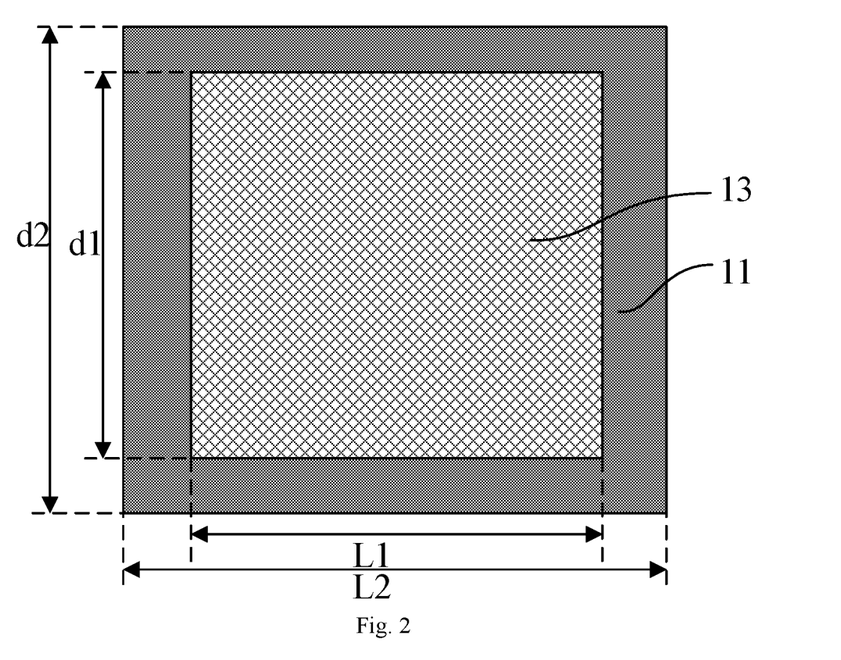
FIG. 2 illustrates a planar schematic diagram of a rigid carrier plate and a flexible base plate in an embodiment of the present disclosure.

As shown in FIG. 2, in the first direction, a size L1 of the flexible base plate 13 is smaller than a size L2 of the rigid carrier plate 11; in the second direction, a size d1 of the flexible base plate 13 is also smaller than a size d2 of the rigid carrier plate 11, wherein the first direction and the second direction are perpendicular to each other and are both parallel to a plane where the flexible base plate 13 is located.

For a rigid carrier plate 11 with a certain size, by setting the size L1 of the flexible base plate 13 to be smaller than the size L2 of the rigid carrier plate 11 in the first direction and setting the size d1 of the flexible base plate 13 to be smaller than the size d2 of the rigid carrier plate 11 in the second direction, the flexible base plate 13 may have a smaller area than the rigid carrier plate 11. The area of the flexible base plate 13 refers to an area of a surface, arranged opposite to the rigid carrier plate 11, of the flexible base plate 13; and the area of the rigid carrier plate 11 refers to an area of a surface, arranged opposite to the flexible base plate 13, of the rigid carrier plate 11; the first direction refers to the X direction; and the second direction refers to the Y direction.

Warpage of the rigid carrier plate 11 may be further reduced by lowering the size L1 of the flexible base plate 13 in the first direction and the size d1 of the flexible base plate 13 in the second direction.

Experimental measurement shows that, there is a balance point for an area ratio of the flexible base plate 13 to the rigid carrier plate 11, and warpage of the rigid carrier plate 11 is prevented when the area ratio is less than the area ratio corresponding to the balance point. If the thickness h1 of the rigid carrier plate 11 is 0.7 mm, when the area ratio of the flexible base plate 13 to the rigid carrier plate 11 is smaller than 0.54, warpage of the rigid carrier plate 11 is prevented.

For example, if the thickness h1 of the rigid carrier plate 11 is 0.7 mm, in the first direction, a ratio of the size L1 of the flexible base plate 13 to the size L2 of the rigid carrier plate 11 may be set as 0.6; while in the second direction, a ratio of the size d1 of the flexible base plate 13 to the size d2 of the rigid carrier plate 11 may be set as 0.7, that is, the area ratio of the flexible base plate 13 to the rigid carrier plate 11 is 0.42; and at the moment, warpage of warpage of the rigid carrier plate 11 is prevented.

In this embodiment of the present disclosure, the thickness h1 of the rigid carrier plate 11 is 0.5 mm to 1.1 mm. For example, the thickness h1 of the rigid carrier plate 11 may be 0.6 mm, 0.7 mm, 0.9 mm, etc.

Generally, an existing rigid carrier plate 11 has a thickness smaller than 0.5 mm. However, in this embodiment of the present disclosure, the thickness h1 of the rigid carrier plate 11 is increased to 0.5 mm to 1.1 mm; when the thickness h1 of the rigid carrier plate 11 is larger, the weight of the rigid carrier plate 11 is larger, and a deformation resistance of the rigid carrier plate 11 is also larger; and in this way, the rigid carrier plate 11 may resist a stress caused by thermal shrinkage of the flexible base plate 13, and thus warpage of the rigid carrier plate 11 is further reduced.

Further, the rigid carrier plate 11 has a Young's modulus greater than 80 Pa. For example, the rigid carrier plate 11 has a Young's modulus of 90 Pa, 100 Pa, etc.

When the rigid carrier plate 11 has a larger Young's modulus, the deformation resistance is larger. Therefore, this embodiment of the present disclosure increases the Young's modulus of the rigid carrier plate 11 by improving material compositions of the rigid carrier plate 11, thereby improving the deformation resistance of the rigid carrier plate 11 and further reducing the warpage of the rigid carrier plate 11.

Figure 3:
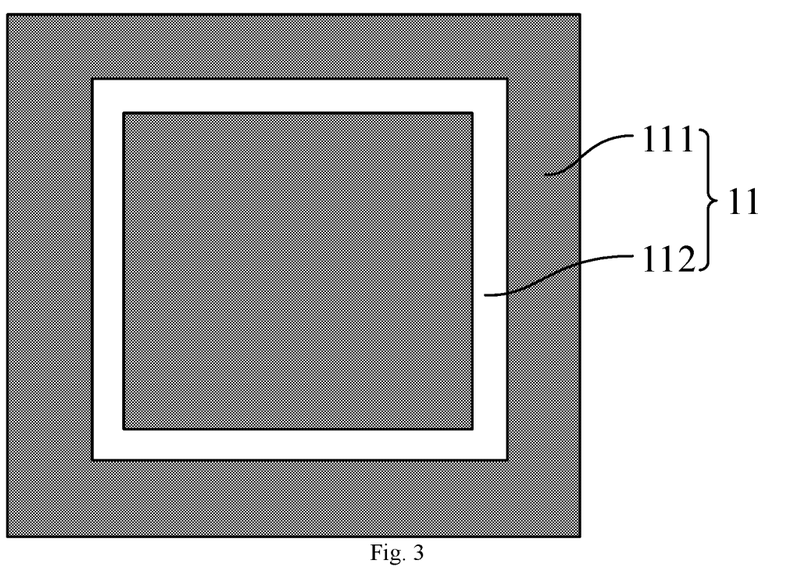
FIG. 3 illustrates a planar schematic diagram of another rigid carrier plate in an embodiment of the present disclosure.

As shown in FIG. 3, the rigid carrier plate 11 includes a metal carrier plate 111 and a glass carrier plate 112 which are arranged at the same layer; the metal carrier plate 111 is provided with a through opening; and the glass carrier plate 112 is arranged in the opening, wherein the metal carrier plate 111 has a larger rigidity than the glass carrier plate 112.

The metal carrier plate 111 and the glass carrier plate 112 form a composite rigid carrier plate, and the metal carrier plate 111 has a larger rigidity than the glass carrier plate 112, so that the composite rigid carrier plate has a larger rigidity than a general glass carrier plate, and the formed composite rigid carrier plate has a deformation resistance, which is capable of further reducing the warpage of the rigid carrier plate 11.

In an actual manufacturing process, after two dimming substrates are manufactured, it is necessary to manufacture a frame sealing adhesive on any one of the dimming substrates; a liquid crystal layer formed between the two dimming substrates by cutting off the frame sealing adhesive is in contact with the environment to guarantee the reliability of a product; ultraviolet irradiation is required during curing of the frame sealing adhesive, that is, in each dimming substrate, the rigid carrier plate 11 at a position where the frame sealing adhesive is correspondingly formed shall meet the requirements of light transmission. Therefore, the metal carrier plate 111 is cut by a cutting process to form the perforative opening, and then the glass carrier plate 112 is arranged in the opening, which not only improves the deformation resistance of the rigid carrier plate 11, but also meets the light transmission requirements of the dimming substrates.

The metal carrier plate 111 may be made from aluminum, and of course, it may be made from other metal materials with a larger rigidity. In addition, an orthographic projection of an opening in the metal carrier plate 111 on the flexible base plate 13 is in a rectangular ring shape.

Figure 4:
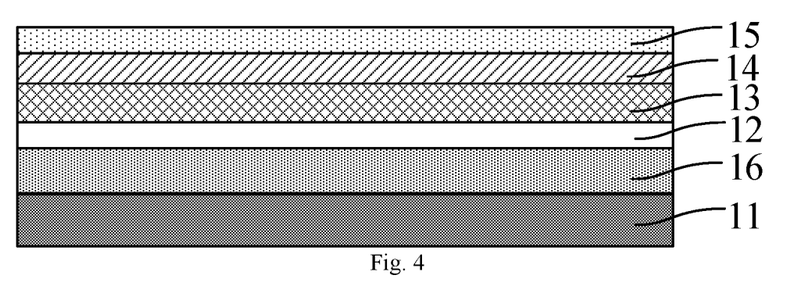
FIG. 4 illustrates a structural schematic diagram of another dimming substrate in an embodiment of the present disclosure.

Further, as shown in FIG. 4, the dimming substrate further includes a stress buffer layer 16 arranged between the rigid carrier plate 11 and the bonding layer 12, wherein the stress buffer layer 16 is configured to recover to a flat state corresponding to a low temperature in a high-temperature cooling process of the dimming substrate, so as to generate an acting force opposite to a deformation direction of the flexible base plate 13.

In a curing process of the orientation layer 15 and the subsequently-formed frame sealing adhesive, the dimming substrate is in a high-temperature environment in which the flexible base plate 13 will expand; when a corresponding manufacturing process is ended, the dimming substrate will be cooled; in a cooling process, the flexible base plate 13 may happen thermal shrinkage deformation; at the moment, the stress buffer layer 16 may be recovered to a flat state corresponding to a low temperature, thereby generating an acting force opposite to the deformation direction of the flexible base plate 13, restraining deformation of the flexible base plate 13, and further reducing the warpage of the rigid carrier plate 11.

Wherein, the stress buffer layer 16 is made from two-way memory alloy of which a low-temperature phase is in a preset flat state. Two-way memory alloy may be recovered to a high-temperature phase shape when heated and may be recovered to a low-temperature phase shape when cooled, and a deformation process of the flexible base plate 13 occurs in a cooling process, therefore the stress buffer layer 16 in this embodiment of the present disclosure should to be prepared by adopting two-way memory alloy.

Specifically, the two-way memory alloy may be Cu-based two-way memory alloy or other materials, such as CuZnAl, CuZnNi, CuAlBe, etc.

Figure 5:
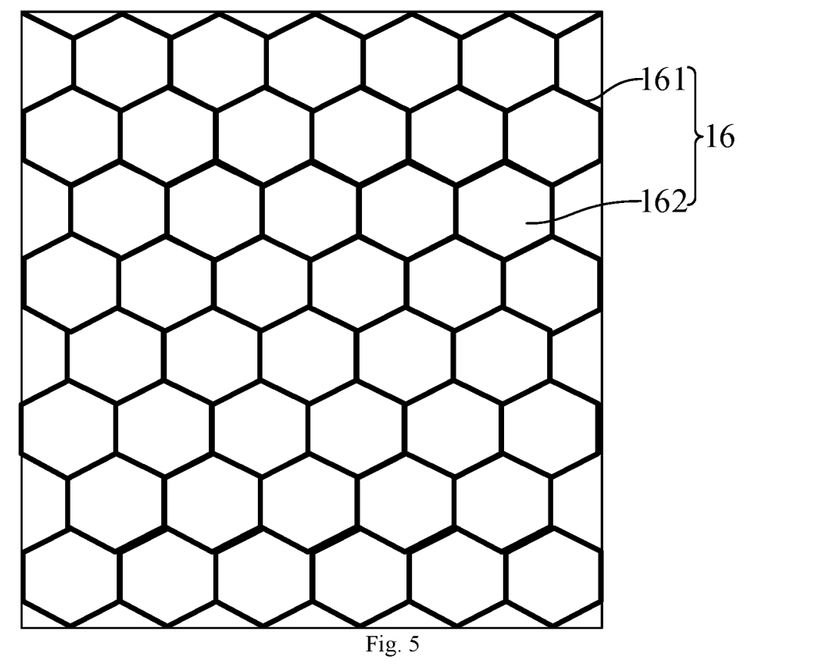
FIG. 5 illustrates a planar schematic diagram of a stress buffer layer in an embodiment of the present disclosure.

As shown in FIG. 5, the stress buffer layer 16 is of a netlike structure.

Specifically, the netlike structure includes a plurality of grids; each grid includes a plurality of wires 161 and a hollow area 162, wherein the wires are connected end to end in sequence; the hollow area 162 is surrounded by the plurality of wires 161 connected end to end in sequence; the wires 161 are made from two-way memory alloy, no material is arranged in the hollow area 162; and in addition, an orthographic projection of the hollow area 162 on the rigid carrier plate 11 is hexagonal.

In order to meet the light transmission requirements of the dimming substrate, it is necessary to firstly form a stress buffer layer film on the rigid carrier plate 11 by adopting a sputtering process, and then the stress buffer layer film is coated with a photoresist; and after the photoresist is exposed and developed, the stress buffer layer film in a photoresist removal area is etched to form a stress buffer layer 16 of a netlike structure.

In this embodiment of the present disclosure, by removing the flexible base films from the bonding layer, the bonding layer only includes one or more adhesive layers, such that the dimming substrate includes less flexible base films. Therefore, in a high-temperature cooling process during product manufacturing, thermal shrinkage stress of the flexible base films may be lowered correspondingly, thus the warpage degree of the rigid carrier plate caused by thermal shrinkage of the flexible base films is lowered, and warpage of the rigid carrier plate is reduced.

Figure 6:
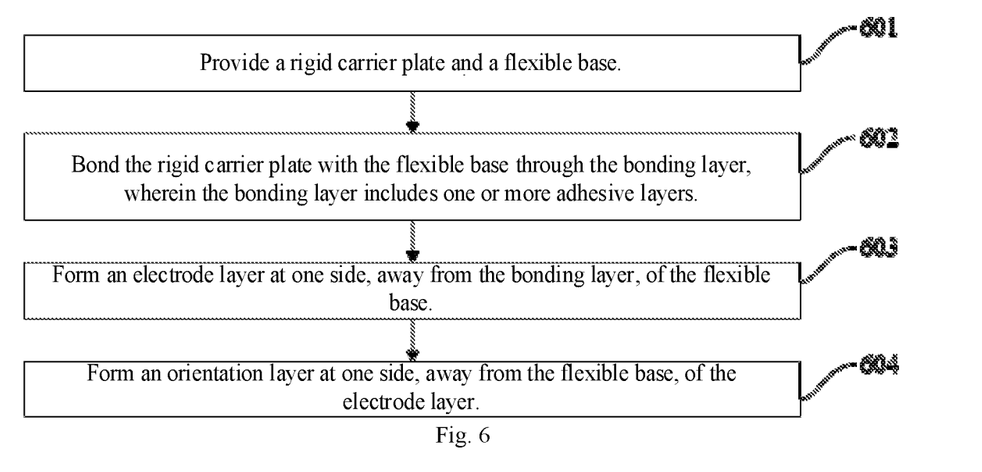
FIG. 6 illustrates a flow chart of a manufacturing method of a dimming substrate in an embodiment of the present disclosure.

FIG. 6 illustrates a flow chart of a manufacturing method of a dimming substrate in an embodiment of the present disclosure, and the manufacturing method specifically includes the following steps:

Step 601, a rigid carrier plate and a flexible base plate are provided.

In this embodiment of the present disclosure, first, the rigid carrier plate 11 and the flexible base plate 13 are manufactured.

The rigid carrier plate 11 may be a whole surface glass carrier plate, or may include a metal carrier plate 111 and a glass carrier plate 112 which are arranged at the same layer, the metal carrier plate 111 is provided with a through opening, and the glass carrier plate 112 is arranged in the opening; and moreover, the rigid carrier plate 11 may have a thickness h1 of 0.5 mm to 1.1 mm, and a Young's modulus greater than 80 Pa.

However, the flexible base plate 13 has a thermal shrinkage rate smaller than or equal to 0.01% in a first direction and also has a thermal shrinkage rate less than or equal to 0.01% in a to second direction; in addition, a size L1 of the flexible base plate 13 is smaller than a size L2 of the rigid carrier plate 11 in the first direction; and a size d1 of the flexible base plate 13 is also smaller than a size d2 of the rigid carrier plate 11 in the second direction.

Step 602, the rigid carrier plate and the flexible base plate are bonded through bonding layer, and the bonding layer includes one or more adhesive layers.

In this embodiment of the present disclosure, after being manufactured, the rigid carrier plate 11 and the flexible base plate 13 are bonded through the bonding layer 12.

Wherein, the bonding layer 12 includes one or more adhesive layers. When the bonding layer 12 includes a plurality of adhesive layers, foaming materials may be doped in the adhesive layers, close to the flexible base plate 13, in the bonding layer 12.

Specifically, the step 602 includes: a stress buffer layer is formed on the rigid carrier plate; the rigid carrier plate provided with the stress buffer layer is bonded with the flexible base plate; and the bonding layer is located at a side, away from the rigid carrier plate, of the stress buffer layer.

After the rigid carrier plate 11 is obtained, firstly a stress buffer layer 16 is formed on the rigid carrier plate 11; specifically, a patterning process may be adopted to form the stress buffer layer 16 which is of a netlike structure on the rigid carrier plate 11; the stress buffer layer 16 is made from two-way memory alloy; and subsequently, the rigid carrier plate 11 provided with the stress buffer layer 16 is bonded with the flexible base plate 13 through the bonding layer 12. At the moment, the bonding layer 12 is located at a side, away from the rigid carrier plate 11, of the stress buffer layer 16, that is, the stress buffer layer 16 is located between the bonding layer 12 and the rigid carrier plate 11.

Certainly, the rigid carrier plate 11 and the flexible base plate 13 may be directly bonded through the bonding layer 12, that is, the bonding layer 12 is in direct contact with the rigid carrier plate 11 and the flexible base plate 13, respectively.

Step 603, an electrode layer is formed at a side, away from the bonding layer, of the flexible base plate.

In this embodiment of the present disclosure, after the rigid carrier plate 11 and the flexible base plate 13 are bonded through the bonding layer 12, the electrode layer 14 is formed at the side, away from the bonding layer 12, of the flexible base plate 13.

The electrode layer 14 may be a surface electrode or may include a plurality of strip electrodes. When the electrode layer 14 is a surface electrode, a whole layer of electrode film is directly deposited at a side, away from the bonding layer 12, of the flexible base plate 13 so as to form a surface electrode; when the electrode layer 14 includes a plurality of strip electrodes, firstly, a whole layer of electrode film is deposited at a side, away from the bonding layer 12, of the flexible base plate 13; subsequently, the electrode film is coated with a photoresist; the photoresist is exposed and developed; and then the electrode film in a photoresist removal area is etched to form a plurality of strip electrodes.

Step 604, an orientation layer is formed at one side, away from the flexible base plate, of the electrode layer.

In this embodiment of the present disclosure, after the electrode layer 14 is formed at the side, away from the bonding layer 12, of the flexible base plate 13, an orientation layer 15 is formed at a side, away from the flexible base plate 13, of the electrode layer 14, so as to form a dimming substrate shown in FIG. 1 or FIG. 4.

Specifically, the orientation layer 15 may be formed at the side, away from the flexible base plate 13, of the electrode layer 14 by a coating process or a printing process; and in addition, the orientation layer 15 needs to be frictionally orientated, so that long axes of liquid crystal molecules in a subsequently-formed liquid crystal layer may be orientated in a certain direction.

In this embodiment of the present disclosure, by removing the flexible base films from the bonding layer, the bonding layer only includes one or more adhesive layers, such that the dimming substrate includes less flexible base films. Therefore, in a high-temperature cooling process during product manufacturing, thermal shrinkage stress of the flexible base films is capable of being lowered correspondingly, thus the warpage degree of the rigid carrier plate caused by thermal shrinkage of the flexible base films is lowered, and warpage of the rigid carrier plate is reduced.

Figure 7:
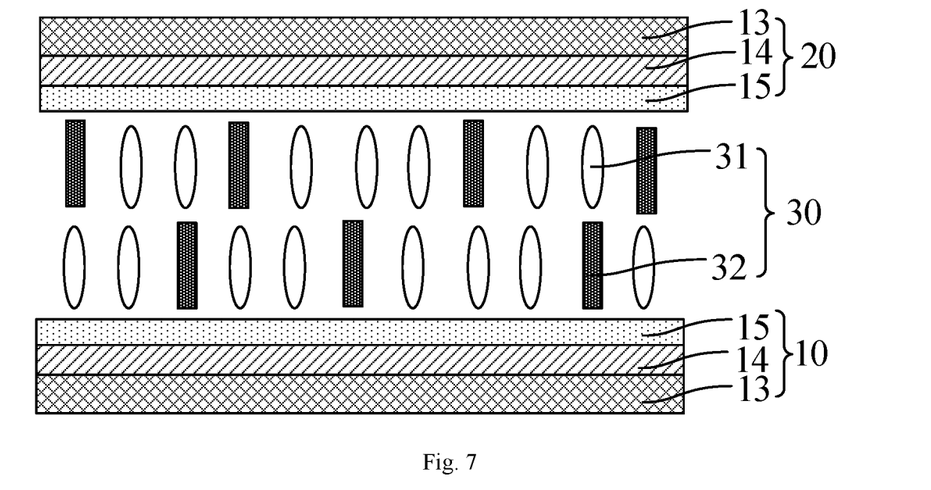
FIG. 7 illustrates a structural schematic diagram of a dimming structure in an embodiment of the present disclosure.

FIG. 7 illustrates a structural schematic diagram of a dimming structure in an embodiment of the present disclosure.

This embodiment of the present disclosure provides a dimming structure, which includes a first dimming substrate 10, a second dimming substrate 20 and a liquid crystal layer 30, wherein the first dimming substrate 10 and the second dimming substrate 20 are arranged oppositely; the liquid crystal layer 30 is arranged between the first dimming substrate 10 and the second dimming substrate 20; each of the first dimming substrate 10 and the second dimming substrate 20 is a structure obtained by stripping the rigid carrier plate 11 and the bonding layer 12 from the above-mentioned dimming substrate; and the orientation layers 15, the electrode layers 14 and the flexible base plates 13 in the first dimming substrate 10 and the second dimming substrate 20 are all arranged away from the liquid crystal layer 30 in sequence.

Specifically, the first dimming substrate 10 and the second dimming substrate 20 each include a flexible base plate 13, an electrode layer 14 and an orientation layer 15 which are sequentially stacked.

In an actual manufacturing process, firstly, two above-mentioned dimming substrates are manufactured; each of the dimming substrates includes a rigid carrier plate 11, a bonding layer 12, a flexible base plate 13, an electrode layer 14 and an orientation layer 15 which are sequentially stacked; subsequently, a frame sealing adhesive is formed on the orientation layer 15 of any dimming substrate; afterwards, liquid crystal molecules are dripped, and the two dimming substrates are aligned in a box; and finally, the rigid carrier plates 11 and the bonding layers 12 in the two dimming substrates are stripped from the corresponding dimming substrates through a stripping process so as to manufacture the dimming structure of this embodiment of the present disclosure.

Wherein, the rigid carrier plates 11 and the bonding layers 12 may be stripped from the corresponding dimming substrates by adopting a thermal foaming stripping process, a mechanical stripping process or a laser stripping process, so as to realize separation of the rigid carrier plates 11 and the bonding layers 12 from the flexible base plates 13.

A first voltage is supplied to the electrode layer 14 in the first dimming substrate 10 and a second voltage is supplied to the electrode layer 14 in the second dimming substrate 20, so that the liquid crystal layer 30 in the dimming structure is in an electric field, and the liquid crystal layer 30 is reversed under the action of the electric field generated between the first dimming substrate 10 and the second dimming substrate 20, thereby controlling a light transmittance of the dimming structure.

Furthermore, the electrode layers 14 in the first dimming substrate 10 and the second dimming substrate 20 may both be surface electrodes or strip electrodes. When the electrode layers 14 in the first dimming substrate 10 and the second dimming substrate 20 are both strip electrodes, the strip electrodes in the electrode layer 14 in the first dimming substrate 10 are distributed in a first direction, while the strip electrodes in the electrode layer 14 in the second dimming substrate 20 are distributed in a second direction; and the first direction and the second direction are perpendicular to each other, therefore the dimming structure may selectively implement regional dimming.

Wherein, the liquid crystal layer 30 is a dye liquid crystal layer, in which dichroic dye molecules 32 are doped in liquid crystal molecules 31; and the dichroic dye molecules 32 in the liquid crystal layer 30 selectively absorb light, thereby realizing the switch between a bright state and a dark state of the dimming structure.

This embodiment of the present disclosure further provides a dimming module, which includes the above-mentioned dimming structure.

In practical application, the dimming structure may be applied to the fields of architecture, transportation, etc., such as the fields of automobile window products, hotel partition products, and office partition products.

Figure 8:
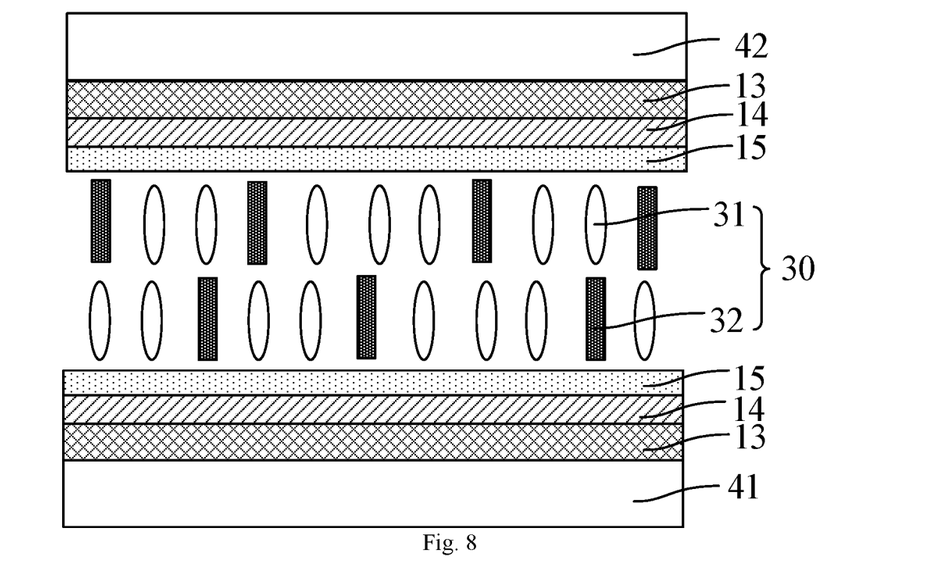
FIG. 8 illustrates a structural schematic diagram of a dimming module in an embodiment of the present disclosure.

For example, if the dimming structure may be applied to an automobile window, the dimming module may be an automobile window; at the moment, as shown in FIG. 8, the dimming module includes a dimming structure and further includes first tempered glass 41 and second tempered glass 42 which are oppositely arranged; and the dimming structure is arranged between the first tempered glass 41 and the second tempered glass 42.

After being manufactured, the dimming structure may be bonded with the first tempered glass 41 and the second tempered glass 42 respectively, so as to form a dimming module.

In this embodiment of the present disclosure, by removing the flexible base films from the bonding layer, the bonding layer only includes one or more adhesive layers, such that the dimming substrate includes less flexible base films. Therefore, in a high-temperature cooling process during product manufacturing, thermal shrinkage stress of the flexible base films is capable of being lowered correspondingly, thus the warpage degree of the rigid carrier plate caused by thermal shrinkage of the flexible base films is lowered, and warpage of the rigid carrier plate is reduced.

For the sake of a brief description, the aforementioned methods and embodiments are all described as a combination of a series of actions, but those skilled in the art should know that the present disclosure is not limited by the action sequence described; and according to the present disclosure, some steps may be performed in another sequence or be performed simultaneously. Secondly, those skilled in the art should also know that the embodiments described in the specification are all preferred embodiments, and the actions and modules involved are not necessarily necessary for the present disclosure.

All embodiments in the specification are described progressively; the key point of each embodiment is intended to describe the differences from the other embodiments; and the same or similar parts of all the embodiments refer to each other.

Lastly, it should be noted that, relational terms such as 'first' and 'second' herein are merely used to distinguish one entity or operation from another entity or operation, and do not necessarily require or imply any such actual relationship or sequence between these entities or operations. In addition, the terms 'comprise' and 'include' or any other variants thereof are intended to cover nonexclusive 'include', such that a process, method, product or device including a series of elements does not merely include those elements, but also includes other elements which are not listed clearly, or further includes inherent elements of this process, method, product or device. Without more limitations, an element defined by a sentence 'include one . . . ' means that a process, method, product or device including the element may still include another same element.

The dimming substrate, the manufacturing method of the dimming substrate, the dimming structure and the dimming module provided by the present disclosure are described above in detail. Specific embodiments are used herein to explain the principle and implementations of the present disclosure. The description of the above embodiments is merely used to help understand the method of the present disclosure and the core concept of the method; meanwhile, those of ordinary skill in the art may make changes to specific implementations and application range according to the concept of the present disclosure; and in conclusion, the content of the specification should not be construed as a limitation to the present disclosure.

The invention claimed is:

1. A dimming substrate, comprising: a rigid carrier plate, a bonding layer, a flexible base plate, an electrode layer and an orientation layer which are sequentially arranged in layer configuration;
    wherein the bonding layer comprises one or more adhesive layers;
    wherein the dimming substrate further comprises a stress buffer layer arranged between the rigid carrier plate and the bonding layer,
    wherein the stress buffer layer is configured to, during a process of cooling from an expansion state in a high-temperature environment of the dimming substrate, recover to a flat state corresponding to a low temperature from a high-temperature phase shape corresponding to the high-temperature environment, so as to generate an applied force opposite to a deformation direction of the flexible base plate;
    wherein the stress buffer layer is made from a two-way memory alloy.

2. The dimming substrate according to claim 1, wherein the bonding layer comprises a plurality of adhesive layers, and foaming materials are doped in the adhesive layers, close to the flexible base plate, in the bonding layer.

3. The dimming substrate according to claim 1, wherein a thermal shrinkage rate of the flexible base plate in a first direction is less than or equal to 0.01%, and a thermal shrinkage rate of the flexible base plate in a second direction is also less than or equal to 0.01%,
    wherein the first direction and the second direction are perpendicular to each other, and are both parallel to a plane where the flexible base plate is located.

4. The dimming substrate according to claim 1, wherein the flexible base plate has a smaller size than the rigid carrier plate in a first direction, and also has a smaller size than the rigid carrier plate in a second direction;
    wherein the first direction and the second direction are perpendicular to each other, and are both parallel to a plane where the flexible base plate is located.

5. The dimming substrate according to claim 1, wherein the rigid carrier plate has a thickness of 0.5 mm to 1.1 mm.

6. The dimming substrate according to claim 1, wherein the rigid carrier plate has a Young's modulus greater than 80 Pa.

7. The dimming substrate according to claim 1, wherein the rigid carrier plate comprises a metal carrier plate and a glass carrier plate arranged on a same layer; the metal carrier plate is provided with a perforative opening; the glass carrier plate is arranged in the opening;
   wherein the metal carrier plate has a larger rigidity than the glass carrier plate.

8. The dimming substrate according to claim 1, wherein the stress buffer layer is of a netlike structure.

9. The dimming substrate according to claim 8, wherein the netlike structure includes a plurality of grids, each grid includes a plurality of wires and a hollow area, the wires are connected end to end in sequence; and
   the hollow area is hexagon.

* * * * *